May 6, 1952 — C. T. PATTERSON — 2,595,976
POWER SCYTHE AND STALK CUTTER
Filed Jan. 10, 1946 — 3 Sheets-Sheet 1
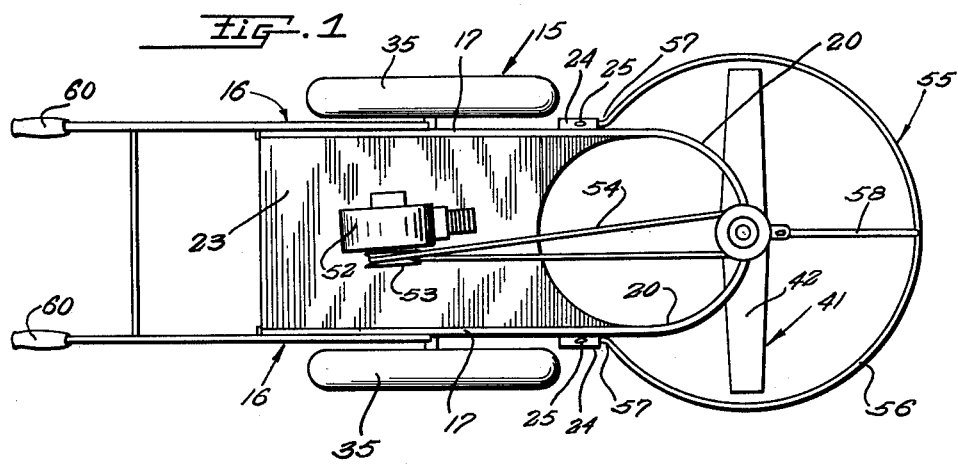
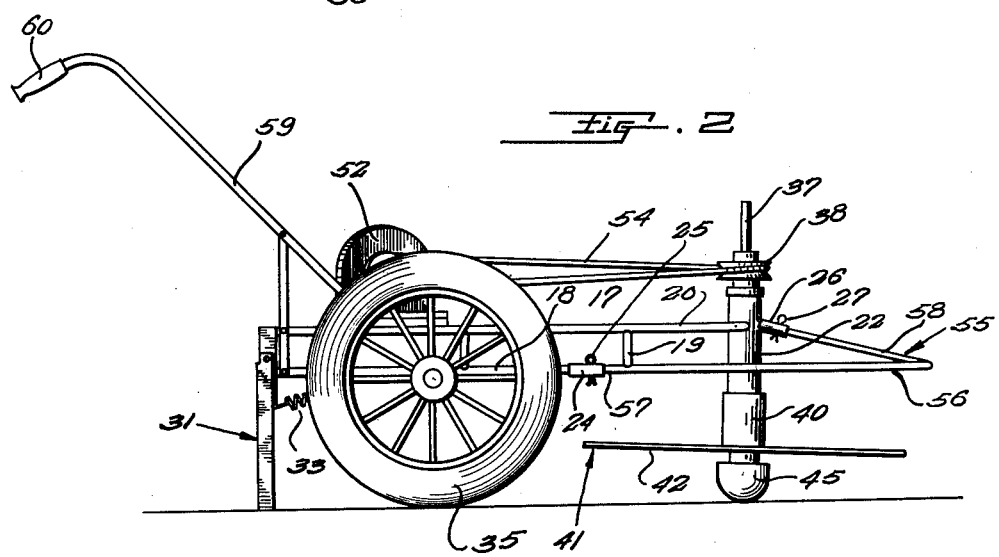
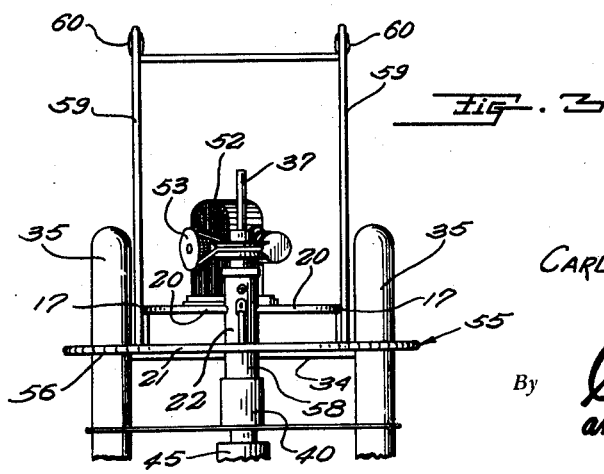
Inventor
CARL THOMPSON PATTERSON

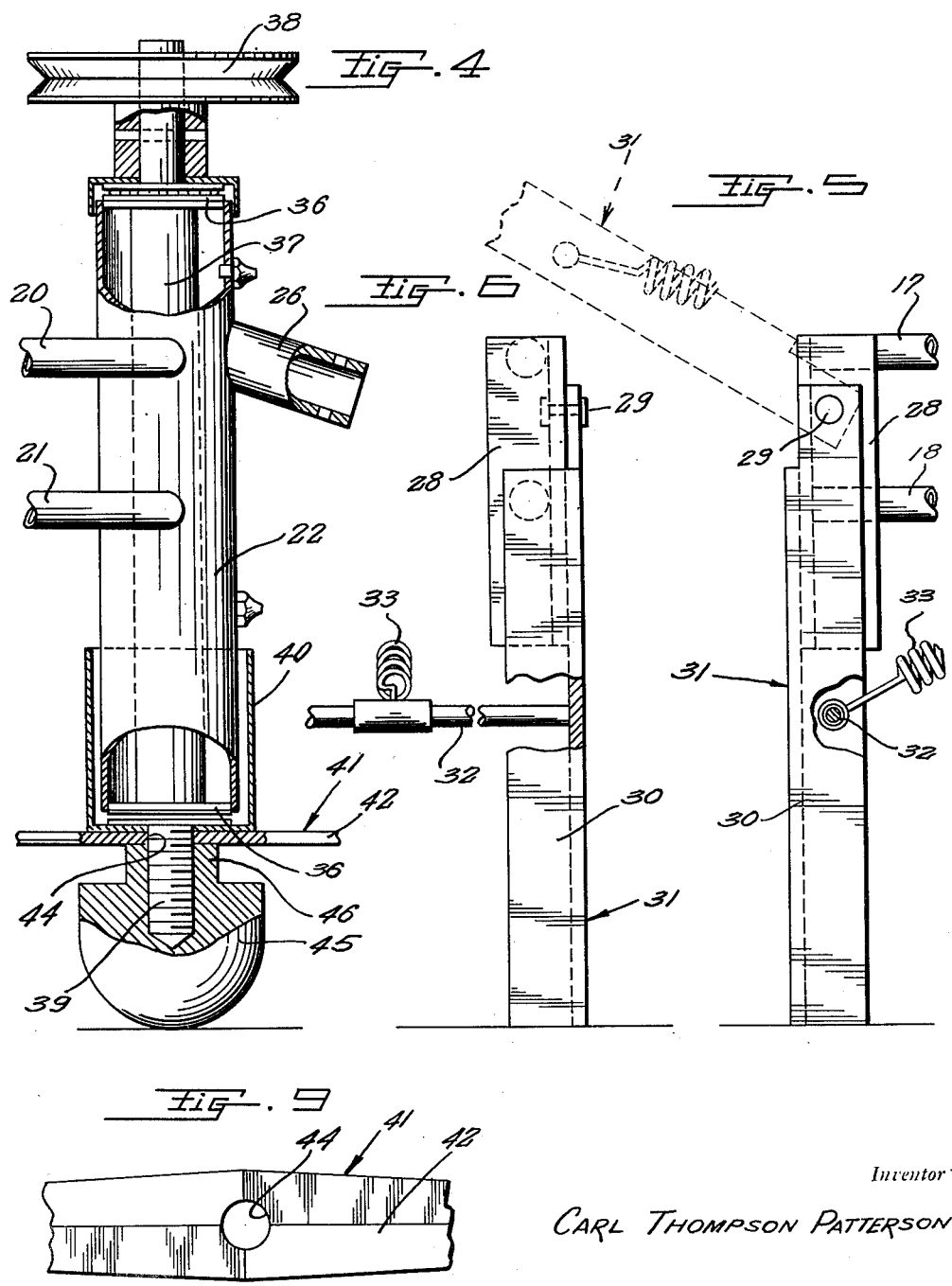

May 6, 1952 C. T. PATTERSON 2,595,976
POWER SCYTHE AND STALK CUTTER
Filed Jan. 10, 1946 3 Sheets-Sheet 3
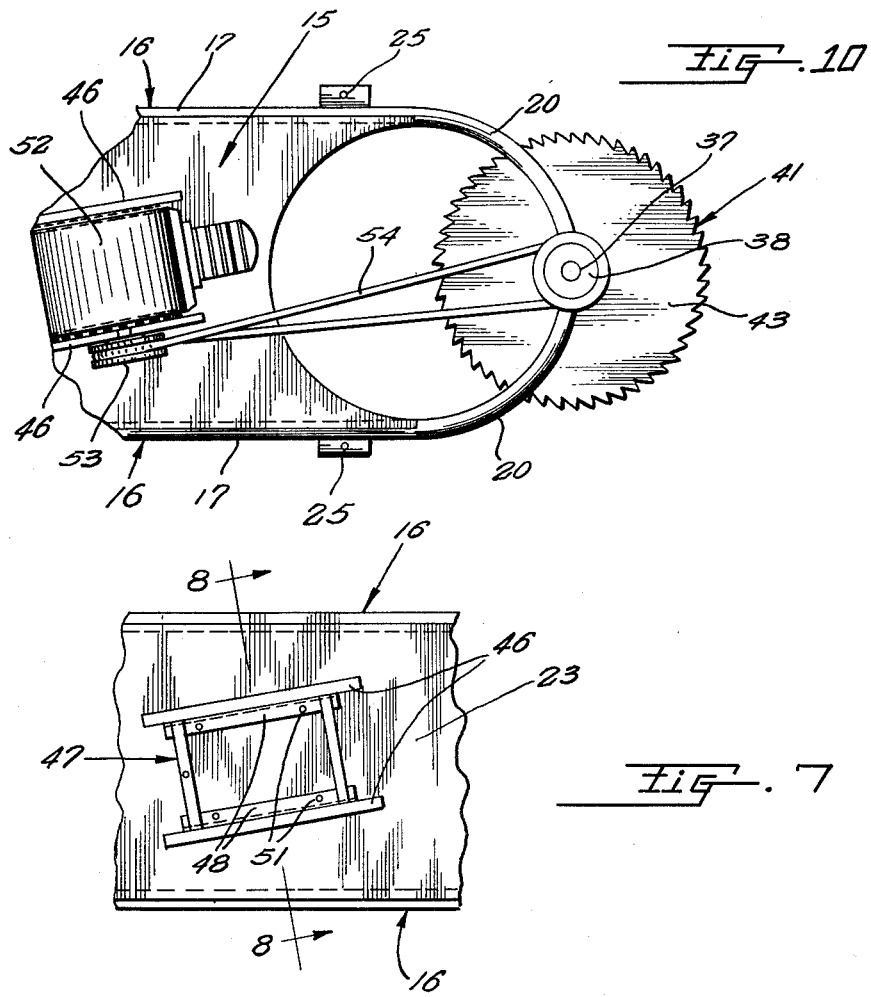
Inventor
CARL THOMPSON PATTERSON
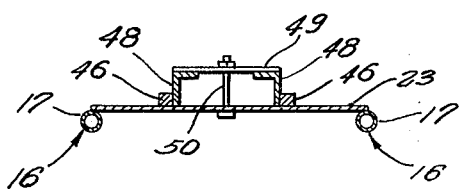
Attorneys Patented May 6, 1952

2,595,976

UNITED STATES PATENT OFFICE 2,595,976

POWER SCYTHE AND STALK CUTTER

Carl Thompson Patterson, Adrian, Mo.

Application January 10, 1946, Serial No. 640,315

1 Claim. (Cl. 56—25.4)

This invention relates to a power scythe and stalk cutter and has for its object to facilitate the cutting of tall grass, weeds and the like and also to sever the stalks of shrubbery and growths of similar nature.

Another object is to enable the cutter to be used for cutting grass and weeds without endangering the tree trunks and stalks of shrubbery when the cutting thereof is undesirable.

The above and other objects may be attained by employing this invention which embodies among its features a frame supporting at its forward end a substantially vertical column through which a power shaft is rotatably supported, a rotary cutter mounted adjacent the lower end of the power shaft, a drive pulley adjacent the upper end of the power shaft, a prime mover mounted on the frame and having driving connection with the drive pulley and a semispheroidal supporting element at the lower end of the shaft to bear on the ground and support the rotary cutter in cutting relation to the ground.

Other features include a detachable guard adapted to be mounted on the device and to encircle the forward portion of the sweep of the cutter so as to guard trees, shrubbery and the like from injury while cutting grass in the immediate vicinity thereof.

In the drawings:

Figure 1 is a plan view of a power scythe and stalk cutter embodying the features of this invention, Figure 2 is a side view of Figure 1, Figure 3 is a front end view of Figure 1, Figure 4 is an enlarged side view partially in section of the shaft supporting column, Figure 5 is a fragmentary side view of the rear end of the frame showing the supporting legs attached thereto, Figure 6 is a fragmentary rear end view of Figure 5, Figure 7 is a fragmentary plan view of the device showing the prime mover removed to illustrate the adjusting features thereof, Figure 8 is a transverse sectional view taken substantially along the line 8—8 of Figure 7, Figure 9 is a plan view of the cutting blade employed for cutting grass, and Figure 10 is a fragmentary plan view of the device showing it equipped with a cutting blade suitable for cutting trees and stalks of shrubbery or the like.

Referring to the drawings in detail my improved power scythe and stalk cutter designated generally at 15 comprises a frame composed of side members designated generally at 16 each of which comprises vertically spaced tubular side bars 17 and 18 held in spaced parallel relation by spacers 19. Formed at the forward ends of the side bars 17 and 18 respectively are converging extensions 20 and 21 which are welded or otherwise secured to a substantially perpendicular tubular column 22. The side members 16 are held in spaced parallel relation by means of a suitable plate 23 which is welded or otherwise secured to the side bar 17 and forms a supporting platform on which a prime mover to be hereinafter more fully described is adjustably supported. Secured to the side bars 18 adjacent their forward end and their junctions with the extensions 22 are sockets 24 which are pierced to receive cotter pins 25, the purpose of which will more fully hereinafter appear and extending forwardly and downwardly from the column 22 is a socket 26 which like the sockets 24 is pierced to receive a cotter pin 27.

Welded or otherwise attached to the rear ends of the side bars 17 and 18 are vertically extending angle bars 28 intermediate the ends of which are pivoted as at 29 the upper ends of legs 30 of a frame or stand designated generally at 31. This stand 31 comprises the legs 30 which are joined by a cross bar 32 to which one end of a retractile coil spring 33 is attached. An axle shaft 34 extends transversely of the frame intermediate the ends of the side members 16 and supports at opposite ends ground wheels 35 upon which the weight of the device is sustained. The end of the coil spring 33 opposite that which is attached to the cross bar 32 is secured to the axle shaft 34 so that the frame 31 when moved about its pivots 29 will be held in either frame supporting position as illustrated in full lines in Figures 5 and 6 or may be held in elevated position as suggested by the dotted lines in Figure 5.

Rotatably mounted axially of the tubular column 22 in suitable anti-friction bearing 36 is a shaft 37 carrying at its upper end a drive pulley 38 and provided at its lower end with an externally screw threaded extension 39. A cup shaped sleeve 40 fits over the threaded end 39 of the shaft 37 and forms an abutment for a rotary cutter designated generally at 41. This cutter may take the form of a blade 42 (Figure 9) or of a saw blade 43 (Figure 10) and the cutter is provided with a central aperture 44 to receive the threaded end 39 of the shaft 37. Threadedly connected to the threaded end 39 of the lower end of the shaft 37 is a semi-spheroidal supporting element 45 provided with a reduced neck 46, the external contour of which is preferably provided with flats to form either a square or hexagonal nut so that a wrench may be applied to the semi-spheroidal supporting element to screw it tightly on the threaded extension 39 and clamp the cutter 41 firmly in place on the shaft 37.

Carried by the bed plate 23 are spaced guide bars 46 between which a frame designated generally 47 is slidably supported. This frame 47 comprises spaced angle bars 48 connected by transversely extending end bars 49 which are pierced to receive clamping bolts 50 adjustably to hold the frame 47 in place between the guide bars 46. The angle bars 48 are provided with spaced openings 51 for the reception of attaching bolts by means of which a suitable prime mover 52 may be secured to the bed plate 23. The prime mover in the present instance is illustrated as an internal combustion engine though it may take the form of any suitable source of power and connected to the drive pulley 53 thereof is a drive belt 54 having driving connection with the drive pulley 38 of the shaft 37. It will thus be seen that when the prime mover is set into operation the cutter 41 will be rotated and in case the cutter blade 42 is employed it will serve as a grass and weed cutter and when the cutter blade 43 is employed the cutter may be used to sever tree trunks and the stalks of shrubbery and the like.

In order to protect trees and shrubbery from injury when the grass cutter is being employed I provide a suitable guard designated generally 55 which comprises a substantially circular tubular guide bar or rail 56 which terminates in spaced parallel extensions which are pierced and adapted to enter the sockets 24. A brace rod 58 rises from the forward end of the guard 55 and the upper end of this brace bar is adapted to be received in the socket 26 as illustrated in Figures 1 and 2. The brace bar 58 is pierced adjacent its upper end so that it may receive the cotter pin 27 and it will be understood that the openings formed in the horizontal extensions on the arms 57 are adapted to align with openings formed in the sockets 24 to receive the cotter pins 25 and thus detachably secure the guard 55 in place.

Suitable handle bars 59 rise from the frame and extend upwardly and rearwardly and these handle bars are provided adjacent their upper rear ends with suitable hand grips 60 to facilitate the manipulation of the device by the user.

In operation it will be understood that with the prime mover 52 set into operation the shaft 37 will revolve thus causing the blade 41 to rotate and in case the grass cutting blade 42 is employed it is obvious that weeds and grass may be cut with the semi-spheroidal supporting element serving as a gauge to determine the height of the grass left standing. In the actual construction of the device I find it advantageous to incline the column 22 slightly off of the perpendicular so as to cause the rear end of the blade 41 to be elevated while the forward end will be closer to the ground so as to avoid double cutting of the grass. In ordinary grass cutting operations the guard 55 is placed in position as illustrated in Figures 1, 2 and 3 and it will be evident that cutting may be accomplished close to trees, shrubbery and the like but without injury thereto due to the spacing of the blade therefrom by means of the guard. When it is desired to cut the stalks of trees and shrubbery it is only necessary to remove the guard and substitute the cutter 43 and proceed with the cutting operation.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

A power scythe and stalk cutter comprising a frame and prime mover supported thereon, said frame including vertically spaced upper and lower longitudinal side members having converging ends, a vertical tubular member secured to the converging ends of said side members, a cutter having a shaft journaled in said tubular member and drivingly connected to said prime mover, a substantially circular guard rail having a diameter larger than said cutter and terminating in spaced parallel extensions, socket members carried by said lower side members and receiving said guard extensions, means removably retaining said guard extensions in said socket members, a downwardly inclined socket member secured to said tubular member, an elongated brace rod secured at one of its ends to said guard rail and received at its other end in said inclined socket member, and means removably retaining said brace rod in said inclined socket member.

CARL THOMPSON PATTERSON.

REFERENCES CITED

The following references are of record in the file of this patent:

UNITED STATES PATENTS

| Number | Name | Date |
|---|---|---|
| 425,954 | Paxson | Apr. 15, 1890 |
| 1,656,105 | Durkee | Jan. 10, 1928 |
| 1,868,347 | Cloud | July 19, 1932 |
| 2,200,368 | Iverson | May 14, 1940 |
| 2,312,972 | Orr | Mar. 2, 1943 |
| 2,359,358 | Dielschneider | Oct. 3, 1944 |
| 2,390,321 | Packwood | Dec. 4, 1945 |

FOREIGN PATENTS

| Number | Country | Date |
|---|---|---|
| 416,140 | Great Britain | Sept. 13, 1934 |